(No Model.)
M. A. REPLOGLE.
MECHANICAL SPEED GOVERNOR.
No. 603,345. Patented May 3, 1898.
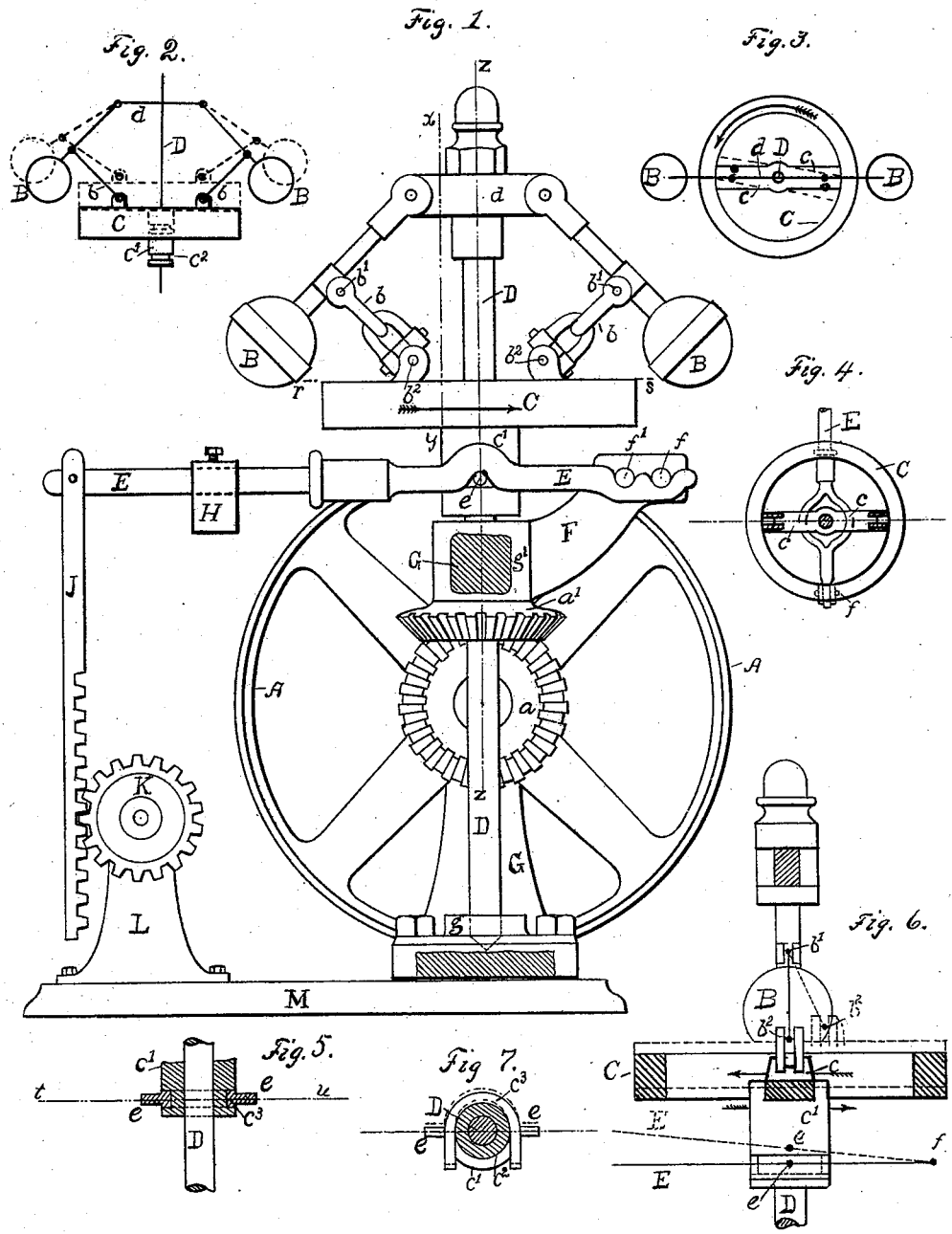
WITNESSES
A. J. Branda
L. M. Nordt
INVENTOR
Mark A. Replogle
per D. B. Replogle
Atty.

UNITED STATES PATENT OFFICE.

MARK A. REPLOGLE, OF AKRON, OHIO.

MECHANICAL SPEED-GOVERNOR.

SPECIFICATION forming part of Letters Patent No. 603,345, dated May 3, 1898.

Application filed August 6, 1897. Serial No. 647,286. (No model.)

*To all whom it may concern:*

Be it known that I, MARK A. REPLOGLE, a citizen of the United States, residing at Akron, in the county of Summit and State of Ohio, have invented certain new and useful Improvements in Mechanical Speed-Governors; and I declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of mechanical governors which are used in regulating the speed of steam-engines or in setting into and out of operation stronger regulators, such as are used at modern waterpower plants; and its objects are to render such governors more sensitive to changes of speed, more prompt in action, and more efficient generally.

My improvements will be readily understood from the following description taken in connection with the drawings, in which—

Figure 1 shows a side elevation, with parts removed, of a governor exemplifying the principal features of my invention. Fig. 2 is a diagrammatic side view of the pendulums and weight, illustrating part of the operation of the device by the dotted lines. Fig. 3 is a diagrammatic top view of the same, illustrating further the operation of the device. Fig. 4 is a top view taken on the line *r s* of Fig. 1, illustrating the structure of the operating-lever in its relation to the circular weight used in the device. Fig. 5 is a detail view taken partly in cross-section on the line *z z* of Fig. 1, showing the structure and relation of the sleeve and sliding support used in the device. Fig. 6 is a view, partly in diagram and partly in cross-section, taken on the line *x y* of Fig. 1 and illustrating the operation of the circular weight by dotted lines. Fig. 7 is a view, partly in cross-section, taken on the line *t u* of Fig. 5, illustrating the sliding support and its means of attachment to the revolving weight and operating-lever of the device.

In the drawings, A designates the belt-wheel, by which the governor is run, and B B the ordinary pendulums, which are swung from the cross-head $d$, rigidly attached to the revolving spindle D, which is revolved by the beveled gear $a'$, rigidly attached to it, and geared with a beveled gear $a$, rigidly connected with the belt-wheel A, the spindle D being journaled at $g$ and $g'$ to the main frame G, which frame is bolted to the base-plate M.

C designates a weight preferably made in circular form and suspended from the pendulums by flexible connections $b\ b$, consisting of links pivotally attached at $b'$ and $b^2$, making of the connections easily-working universal joints.

The weight C is provided with a central sleeve $c'$, rigidly connected to the periphery or rim by means of the radials $c\ c$, the spindle D sliding loosely in said sleeve. The lower part of the sleeve $c'$ is provided with an annular groove $c^2$, in which the U-shaped sliding support $c^3$ is adapted to fit, so as to permit of a sliding motion. This slide is provided at opposite sides with pins or lugs $e\ e$, which are adapted to support the lever E, fulcrumed at $f$ or $f'$ to the arm, rigidly connected with the frame G. This lever E is further provided with a sliding weight H, adapted to be moved lengthwise of the lever and attached to it by means of a set-screw.

J designates a rack adapted to engage with a toothed wheel K, supported by the journal-stand L, bolted to the base-plate M, the said wheel K being designed when turned one way to increase the power-supply and when turned the opposite way to decrease the power-supply.

The parts J, K, and L are not essential parts of my invention, but are simply inserted here to more fully exemplify the operation of the device, and I do not wish to be confined to the exact construction of the flexible supports or weight suspended from them, as herein shown, the principal requirement of the supports being that they be each a universal joint, and of the weight C that it be suspended by universally-jointed supports from revolving centrifugal weights or pendulums, and that the operation of the power-supply be effected through a connection to the sleeve of the said weight C.

The operation of the governor is described as follows: The pendulums B B are revolved and operated in the usual manner and at high speed lift the weight C, with all its connections, as indicated in the diagram Fig. 2. In addition to utilizing this means of raising and lowering the sleeve the inertia of the weight C is utilized. Upon any sudden increase of the speed of the machinery the pendulums are carried forward slightly faster than the weight C in the direction of the arrow in Fig. 3, thus throwing the flexible supports b b into more oblique positions on account of the lag produced by the inertia of the weight C, which retrogrades it in its relation to the pendulums, as shown by dotted lines, Fig. 3; and it is evident that these supports cannot become more oblique without at the same time raising upward the said weight C and the sleeve rigidly attached to it, and this upward motion last named is independent of any outward motion of the pendulums and is utilized in my device to correct rises in speed without waiting for the upward motion of the pendulums. Further, on account of the resistance of the air and the attachments to the sleeve the weight C at normal speed is always lagging somewhat in the direction of the lower arrow, Fig. 6, so that the flexible supports are not in a plane with the pendulum-rods, but lag outside of the plane, as shown in exaggeration by the dotted lines in Fig. 6. Now, this condition existing, when there is a slight decrease in speed the said weight C, again on account of its inertia, will not slack in speed as suddenly as the revolving pendulums and will accordingly advance in its relation with the said pendulums until the flexible supports are more nearly or altogether into the plane of the pendulum-rods, and at the same time the weight, with its connections, are thus lowered by gravity and more power turned on without waiting for the downward motion of the pendulums. The advantage of this is very considerable, because in this way I secure the minimum of resistance in the mechanical parts or joints of the governor at the right time, while in ordinary governors as now constructed the first tendency in change of speed is to cramp the bearings and produce the greatest resistance on their part at the time they should resist the least. I thus secure in addition to the ordinary raising and lowering of the operating part of the governor an additional and much more prompt action without sacrificing any of the efficiency of the usual governor.

If very high speed is used, the lever E may be fulcrumed at $f'$ instead of at $f$, or the weight H may be moved toward the outer end of the lever E, and if it is desired to govern at a slower speed the lever E may be fulcrumed at $f$ or the weight H moved inward of the lever, or both the fulcrum and the weight may be moved so as to utilize their combined effect. It is evident that by means of this lever E the upward and downward motions of the governor proper are amplified, thus adapting it for making electrical or other connections for setting into operation heavier regulating devices capable of moving water-wheel gates and the like. The connections with power-supply may also be made directly with the sleeve C, as in ordinary governors, thus dispensing with the lever E.

Having thus described my invention, what I claim, and desire to secure by Letters Patent, is—

1. In a governor the combination with revolving pendulums of a weight suspended from them by universal joints the said weight adapted to perform the operation required of the governor independent of a rise or fall of the pendulums by reason of retrogression or advancing of the said weight in its relation to the said pendulums.

2. In a speed-governor, the combination of centrifugal weights, having suspended from them, by universally-jointed supports, an inertia weight, the said inertia weight being integrally made with a sleeve sliding on the spindle of the governor, and adapted to rise and fall in conjunction with the centrifugal weights, and also to rise and fall independently, in its relation to them, in the manner described, and for the purposes set forth.

3. In a mechanical speed-governor the combination of centrifugal weights or pendulums, designed to be affected by greater changes of speed, a weight suspended from them adapted to be raised or lowered in conjunction with said pendulums; and in addition thereto, adapted to be raised or lowered in its relation to said pendulums by minor changes in speed, by means as specified.

4. The herein-described mechanical governor consisting of a spindle, adapted to revolve centrifugal weights, centrifugal weights suspended therefrom, and an inertia weight suspended from said centrifugal weights, said inertia weight being integrally made or rigidly attached to a sleeve sliding upward and downward of said spindle, and attached to a lever intermediate of its fulcrum and operating end, for the purpose of amplifying the action of the governor, substantially as specified.

In testimony whereof I affix my signature in presence of two witnesses.

MARK A. REPLOGLE.

Witnesses:
 FRANK C. SPELLMAN,
 ALICE M. WHEELER.